April 25, 1933.    J. C. CARLIN    1,905,366
MACHINE FOR CUTTING RUBBER STOCK
Filed Sept. 27, 1932    2 Sheets-Sheet 1
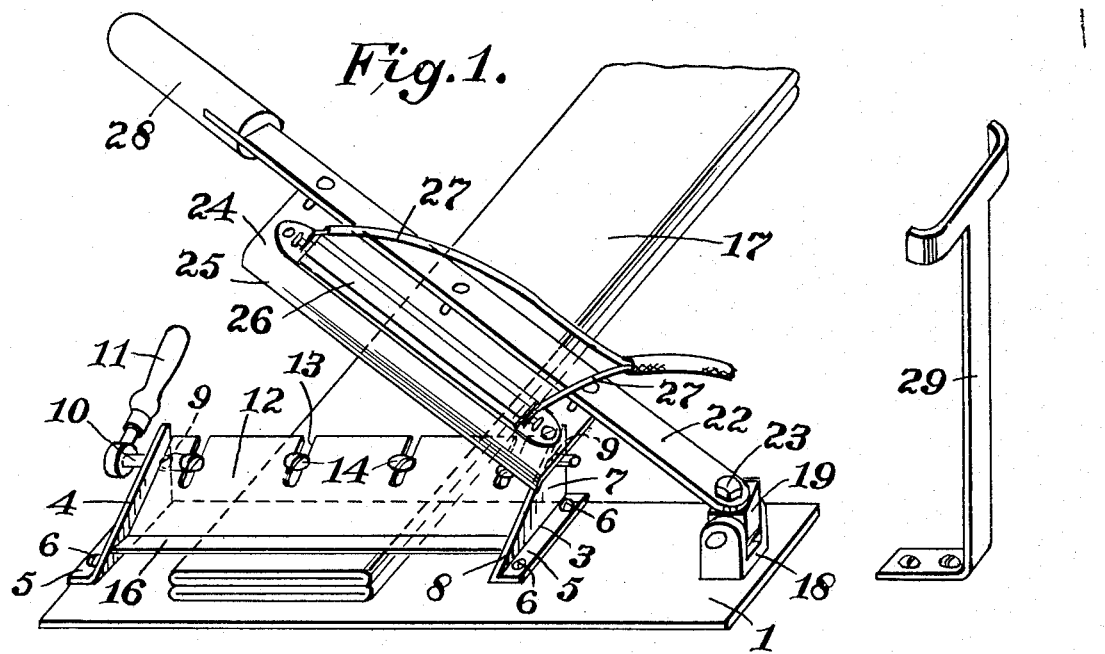
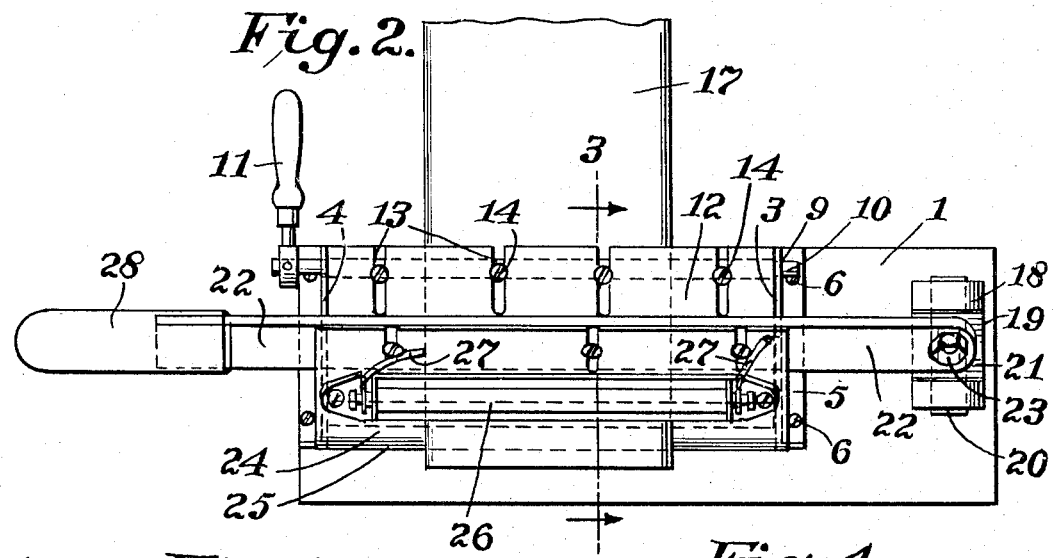
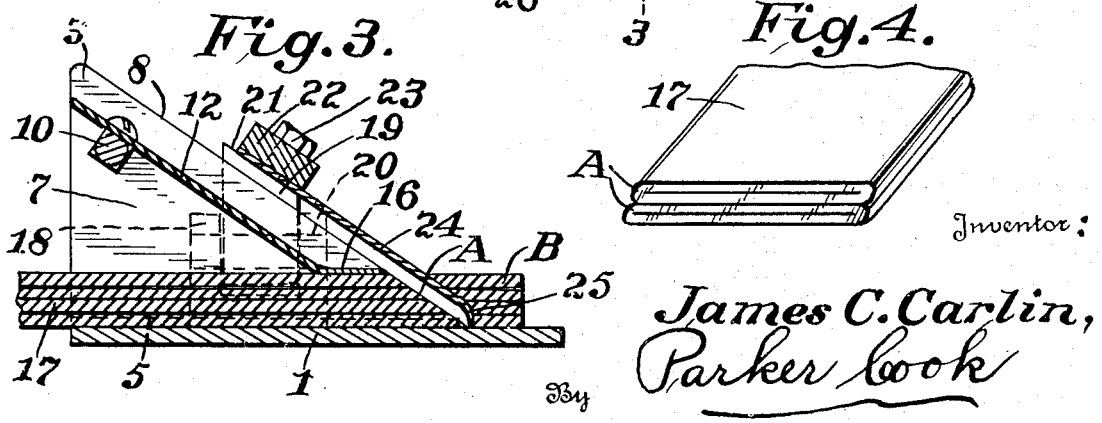
Inventor:
James C. Carlin,
Parker Cook
By
Attorney.

April 25, 1933. J. C. CARLIN 1,905,366
MACHINE FOR CUTTING RUBBER STOCK
Filed Sept. 27, 1932  2 Sheets-Sheet 2
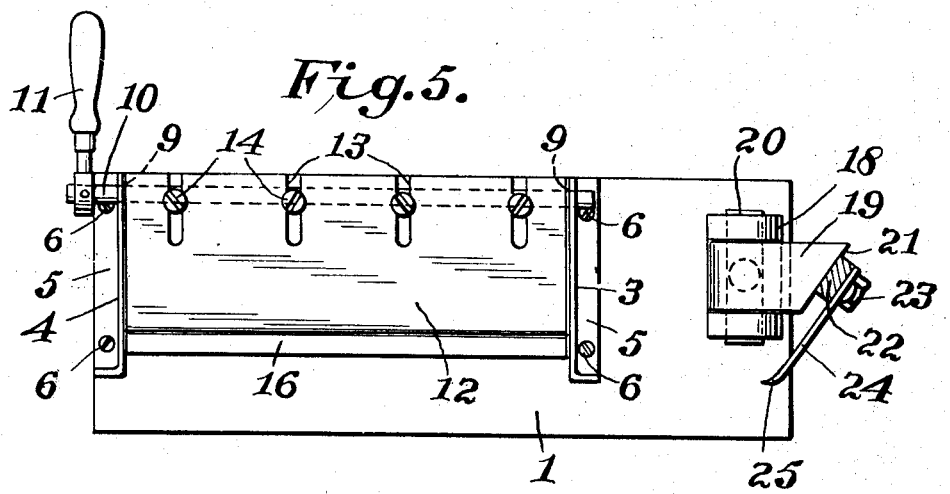
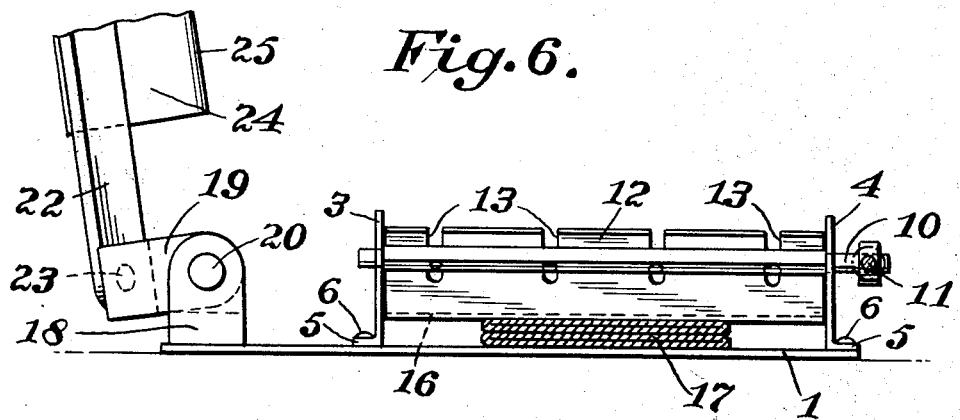
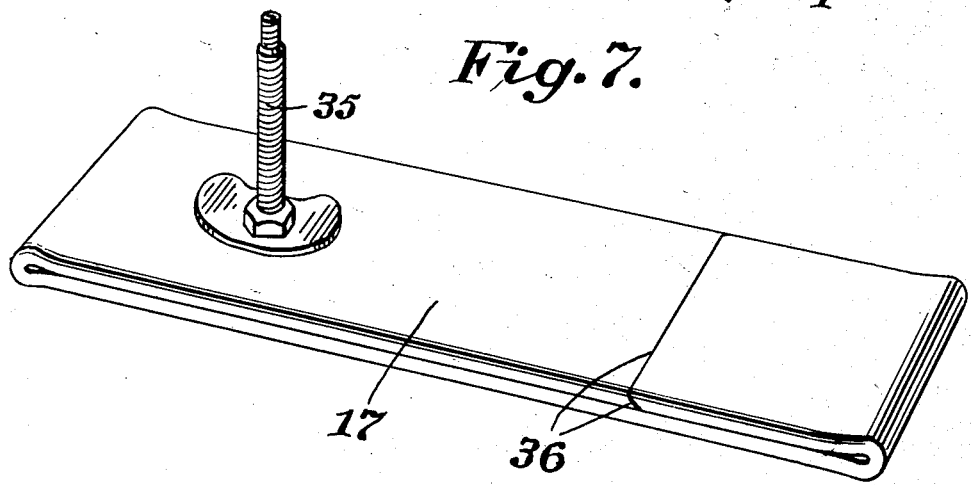
Inventor:
James C. Carlin,
By Parker Cook
Attorney.

Patented Apr. 25, 1933

1,905,366

UNITED STATES PATENT OFFICE

JAMES C. CARLIN, OF NORRISTOWN, PENNSYLVANIA, ASSIGNOR TO LEE RUBBER AND TIRE CORPORATION, OF CONSHOHOCKEN, PENNSYLVANIA, A CORPORATION OF NEW YORK

MACHINE FOR CUTTING RUBBER STOCK

Application filed September 27, 1932. Serial No. 635,108.

My invention relates to new and useful improvements in machines for cutting rubber stock, and more particularly to a machine for cutting and treating the ends of inner tube stock preliminary to splicing and vulcanizing the stock into a circular inner tube.

In a companion case filed by me on September 24, 1932, bearing Serial Number 634,730, there is set out in detail a description of an inner tube and the method of forming the same wherein the ends are spliced and treated in a certain way, while the present application relates to a new and improved machine for carrying out the cutting and treating of the ends.

Still another object of the present invention is to provide a simple and inexpensive machine for clamping the ends of the tubular stock and forming a cut through the several folds at an angle of thirty-five degrees, also treating the ends coincident with the cutting operation so that they may be then perfectly matched and thereafter preliminarily pressed and vulcanized.

Another object of the invention is to provide a form of clamp wherein the ends of the folded stock may be held tightly temporarily, while a heated knife blade may be manually operated to slice through the stock at the desired angle.

Still another object of the invention is to provide a machine for cutting and treating the ends of the tubular stock wherein the knife is guided in its movement through the rubber stock, preferably at an angle of thirty-five degrees, while at the same time the knife is kept at a temperature wherein the ends will be subjected to just sufficient heat to make them semi-plastic, so that when the tube is placed in the vulcanizer the ends having been previously matched will properly adhere, and the tube be as strong at the splice as throughout the remaining body portion.

Still another object of the invention is to provide a machine for cutting and treating the end walls of an inner tube preliminary to the splicing, so that after the tube is in annular form, there will be no appreciable increase in thickness at the splice, at the same time the splice being equal in strength to the remainder of the tube.

Still another object of the invention is to provide a machine wherein the temperature of the knife may be properly regulated, so that the rubber will be softened but not burned at the cut and the splice will adhere properly.

Still another object of the invention is to provide a knife which is curved near its cutting edge, so that as the knife passes through the succeeding folds of rubber, the body of the blade will not remain in contact with the walls of the rubber of the tubular stock, which would tend to heat them past the desired point. In other words, the body of the knife blade is curved slightly outwardly in cross-section, so that as the severing action takes place, the body of the blade moves outwardly away from the severed ends.

Still another object of the invention is to provide a machine wherein the folded free ends of a piece of tubular stock cut to size may be quickly clamped in position, and the ends quickly cut, all on an angle of, say thirty-five degrees, the ends at the same time being properly heat-treated so that they are then in condition to be matched and vulcanized.

With these and other objects in view, the invention consists in certain new and novel arrangements and combination of parts as will be hereinafter more fully described and pointed out in the claims.

Referring now to the drawings showing a preferred embodiment of the invention,

Fig. 1 is a perspective view showing the free ends of the inner tube stock clamped in place, and a heated knife being brought down to prform the cutting operation;

Fig. 2 is a plan view of the machine, the knife having been brought all the way down for the cutting operation;

Fig. 3 is a transverse section, taken on the line 3—3 of Fig. 2;

Fig. 4 is a fragmentary prospective of the tube ends after the cutting operation;

Fig. 5 is a top plan view of the device;

with the knife raised into a position of rest;

Fig. 6 is a rear view thereof, and showing the layers of the tire tube in section; and Fig. 7 is a perspective of the complete tube with the joint indicated therein.

Referring now more particularly to the several views, and for the moment to Fig. 1, there is shown a small base plate 1, and the two end pieces or guide plates 3 and 4. Each guide plate may be a unitary casting or stamping and, as may be seen from the guide plate 3, there is provided an outstanding lower flange 5, which is screwed or bolted, as at 6, to the base 1. The plate is formed with the triangular body portion 7, the hypotenuse 8 extending at an angle of preferably thirty-five degrees to the base.

Near the upper rear edge of these plates 3 and 4 are provided bearings 9, through which passes a rotatable shaft 10, provided on its one end with the handle 11. Adjustably mounted on this rotatable shaft 10 is the clamp plate 12, which is provided with the slots 13, through which pass the studs or screws 14 which, in turn, extends within the rod 10, so that this clamp plate may be adjusted to clamp the various thicknesses of inner tube stock that is to be used.

It will be seen that this clamp plate 12 has the downwardly extending body portion and the outwardly extending portion 16, which is parallel with the tubular stock.

Thus, when it is desired to clamp the tubular stock preliminary to the cutting, the handle 11 will be swung, first, downwardly so that the tubular stock 17 may be placed under the clamping plate 12, and the handle 11 will then be raised, which will force the plate 12 downwardly to tightly hold the stock in position, as clearly seen in Figs. 1 and 3.

Now referring to the knife and its mounting, there will be seen mounted at one end of the base plate 1 a yoke 18, in which there is fitted a block 19 and pivotally held in position by the pin 20.

This block 19 is provided with the angular upper surface 21, the angle corresponding with the angular surface of the guide plates 3 and 4, that is, it extends at an angle of thirty-five degrees to the base or the flat surfaces of the tubular stock held in the clamp.

Now pivotally mounted on this block 19 is an arm 22, through which passes a bolt or stud 23, that is, perpendicular to the angle surface of the block 20.

Carried by the arm 22 is the cutting knife 24, which is slightly curved near its outer edge, as at 25, as may be seen in Figs. 1 and 3. To the rear of this blade 24 is fitted an electric heating element 26, to the opposite ends of which are connected the leads 27. The heating element per se forms no part of the present invention, and any desired or suitable heating element may be utilized. Neither have I shown the means for regulating the amount of heat to be transmitted by the heating element, but it will be understood that means are provided with this heating element for regulating the temperature of the knife.

As before mentioned, it is found desirable to curve the body of the blade of the knife outwardly in order to prevent the heated surface of the knife from remaining in contact with the cut edges for too long a time, which would permit the heat to decompose the rubber.

It will be seen that if a straight knife were used, the walls of the cut, as at A, Fig. 3, would remain in contact with the knife during the whole time required to make the cut, which would cause the surfaces of the just severed walls to be decomposed, rather than made semi-plastic.

It will be seen that by curving the lower edge of the body of the blade, as at 25, only that portion of the surface and wall which is being cut is in contact with the knife, thus avoiding any burning or decomposition of the rubber.

This curved knife is necessary, as it is to be remembered that some of the rubber tubes made today are nearly a quarter of an inch in thickness, and if the blade were straight and remained in contact with the severed walls the first layer of the fold would be subjected to heat while the knife were passing through the second, third and fourth layers, and there would be a tendency to burn the first one or two layers of the stock.

It is true that the scrap ends B, (see Fig. 3) might be burnt with the present arrangement, but these scrap ends are discarded and the burning is of no consequence.

Finally, the arm 22 is provided with a handle 28, while to the right of the machine (Fig. 1) may be seen a bracket 29, so that during the insertion of the stock 17 under the clamp, the arm 22 may be partly rotated and in an upward direction, to rest against the bracket 29, out of the way of the operator.

The operation of the device is exceedingly simple. After the inner tube stock has been cut to the desired length, that is, slightly longer than in its finished form, the two coinciding ends of the folded stock will be placed under the clamp plate 12, and the handle 11 raised to thus tightly clamp the stock in position.

The handle 28 will be then swung from the position shown in Fig. 1 (or from the bracket) to the position shown in Fig. 2, the knife 24 moving downwardly along the guide plates 3 and 4 will thus descend at an angle of thirty-five degrees, it being remembered that the arm 22 is pivoted at its inner end to a block whose surface extends also at an angle of thirty-five degrees. The heated blade then passes through the clamped folds of the stock, the severed walls all being cut in a parallel axis at an angle of thirty-five degrees. Also during this cutting action, the end wall surfaces of the severed folds are heated to a soft and semi-plastic state, due to the heat imparted by the knife.

The tube is then refolded to bring the cut edges A together or, in other words, matched, after which they are pressed or rolled firmly together, the tube being now ready for vulcanization.

In Fig. 7, I have shown the tube 17 in its final annual form, it being understood that the valve 35 has been placed in the tubular stock before the ends are severed, while the matched ends may now be seen forming the relatively small splice at 36.

As pointed out in the companion application, the weak part of an inner tube is that portion directly adjacent the splice, as heretofore it has been the practice to form a relatively heavy cuff or ring where the spliced ends are telescoped and vulcanized, whereas in forming the splice, as shown, and the ends matched rather than telescoped, the usual annular ring or cuff is dispensed with, and the spliced portions and the adjacent body of the tube are as strong as the remainder thereof.

Of course, to withdraw the stock from the cutting machine, the arm 22 will be rotated and swung upwardly to rest in the bracket 29, while the handle 11 of the clamp plate is then forced downwardly, the machine being ready for the succeeding operations.

From the foregoing, it will be seen that I have provided a machine for quickly cutting and heating the ends of an inner tube, preliminary to the vulcanization of the tube in its annular form, and wherein the ends are all cut along a parallel axis at an angle of thirty-five degrees, after which the ends may be matched and readily pressed together by means of pressure applied at ninety degrees to the flat surface of the tube.

Furthermore, the heating operation is coincident with the cutting operation. At the same time, there is no danger of the cut edges of any of the folds being decomposed, rather than made semi-plastic, as the knife blade is so curved that the body of the blade immediately on the cutting moves away from the severed ends.

Although it will be understood that the machine is especially designed for the forming of the splice for inner tubes, still, other rubber articles may be cut and treated equally as well.

I also do not wish to be limited to the exact curvature shown, of the knife, nor the exact angle of the guide plates and the guide block, as these angles might be varied, if desired.

Having thus described my invention, what I claim as new and desire to secure by Letters Patent is:

1. A machine for cutting rubber stock consisting of a base, means for temporarily clamping the stock, a knife, means for heating the knife, guide plates for the knife during its cutting action, and the knife pivotally mounted whereby the same may be swung upwardly away from the stock.

2. A machine for cutting rubber stock consisting of a base, an adjustable clamp for holding the stock, means for operating the clamp, triangularly formed guide plates presenting surfaces extending substantially at a thirty-five degree angle to the base, an arm pivotally mounted at its one end and capable of being lowered along an angle corresponding to the angle of the guide plates, a knife carried by said arm and adapted to contact with and be guided in its downward movement by said guide plates, means for heating the knife whereby the rubber stock will be cut at an angle of thirty-five degrees, and the severed walls also left in a semi-plastic condition.

3. A machine for cutting inner tube stock comprising a base, an adjustable clamp for holding the stock, means for operating the clamp, guide plates forming a part of the clamping means and presenting surfaces extending substantially at a thirty-five degree angle to the base, an arm pivotally mounted at its one end to a support, the upper surface of said support being also formed at an angle corresponding with the angle of the guide plate, a knife carried by said arm, and means for heating the knife whereby the stock is severed at an angle of thirty-five degrees, and the walls of the severed ends heat-treated coincident with the cutting action.

4. A machine for cutting rubber stock comprising a base, an operable clamp for holding the stock, a heated knife arranged to cut the stock at an agle from the vertical, means for heating the knife, and the knife being curved throughout the length of the body portion and near its lower edge whereby the body of the knife passes out of contact with the severed walls immediately after the cutting action.

5. A machine for cutting inner tube stock consisting of a base, means for clamping the stock in position, a knife for cutting the stock at an angle from the vertical, means for guiding the knife during its cutting action, means for heating the knife, the knife being convex on its inner surface whereby immediately after the severing action the inner surface of the knife passes from contact with the severed walls.

6. A machine for cutting inner tube stock consisting of a base, means for clamping the stock in position, an arm mounted at its one end on a horizontal axis and also on an inclined axis, means for guiding the knife during its cutting action at substantially a thirty-five degree angle to the stock, means for heating the knife, the body of the knife presenting a curved surface whereby the body of the knife moves from contact with the severed end walls of the stock immediately after the cutting edge passes through said stock.

7. A machine for cutting the severed walls of inner tube stock consisting of a base, means for temporarily clamping the stock in position, a swinging and pivotally mounted knife, means for guiding the knife during the severing of the stock, means for heating the knife to the desired temperature, and the knife having its cutting edge in a plane different from that of the body of the knife so that the body of the knife passes out of contact with the severed walls immediately after the severing movement of the knife.

In testimony whereof I affix my signature.

JAMES C. CARLIN.